US011664832B1

(12) United States Patent
Puzzo et al.

(10) Patent No.: US 11,664,832 B1
(45) Date of Patent: May 30, 2023

(54) WIDE BAND TUNABLE TRANSCEIVER

(71) Applicant: BAE Systems Information and Electronic Systems Integration Inc., Nashua, NH (US)

(72) Inventors: Dean Puzzo, Alton Bay, NH (US); Michael W. Blum, Milford, NH (US); Christopher R. Bye, Bedford, NH (US)

(73) Assignee: Bae Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 17/215,813

(22) Filed: Mar. 29, 2021

Related U.S. Application Data

(60) Provisional application No. 63/001,179, filed on Mar. 27, 2020.

(51) Int. Cl.
| | |
|---|---|
| *H04B 1/00* | (2006.01) |
| *H04B 1/74* | (2006.01) |
| *H04B 1/04* | (2006.01) |
| *H04B 1/7093* | (2011.01) |

(52) U.S. Cl.
CPC ............ *H04B 1/0096* (2013.01); *H04B 1/04* (2013.01); *H04B 1/745* (2013.01); *H04B 2001/0491* (2013.01); *H04B 2001/70935* (2013.01)

(58) Field of Classification Search
CPC ........ H04B 1/0096; H04B 1/04; H04B 1/745; H04B 2001/0491; H04B 2001/70935
See application file for complete search history.

(56) References Cited

U.S. PATENT DOCUMENTS

| 2,318,268 | A  | * | 5/1943 | Terman | ..................... H04B 7/04 455/283 |
| 10,014,884 | B1 | * | 7/2018 | Dresser | ..................... H04B 1/40 |
| 2005/0094750 | A1 | * | 5/2005 | Park | ........................ H04N 5/38 375/350 |
| 2006/0063487 | A1 | * | 3/2006 | Cleveland | .......... H04B 7/15571 455/22 |

(Continued)

FOREIGN PATENT DOCUMENTS

WO      WO-9612341 A1 * 4/1996 ............. H03D 7/161

OTHER PUBLICATIONS

Yuan Sun, Compact Microwave Filter Designs based on Cavity Resonators, Paper, Apr. 2016, Semantic Scholar, University of Ontario Institute of Technology, 85 pages.

(Continued)

*Primary Examiner* — Jean B Corrielus
(74) *Attorney, Agent, or Firm* — Scott J. Asmus

(57) ABSTRACT

A transceiver having a transceiver including a down-converter for converting a radio-frequency (RF) input signal to an intermediate frequency (IF) signal with an analog low latency bypass path coupled to the IF signal and configured to provide a low latency IF signal. There is a digital path coupled to the IF signal and configured to provide a digitally processed IF signal, and an up-converter for converting at least one of the low latency IF signal and the digitally processed IF signal to an RF output signal. In a further example, the down-converter and the up-converter convert to millimeter wave frequencies and filters the millimeter wave frequencies with cavity filters comprising quartz.

24 Claims, 10 Drawing Sheets

(56) References Cited

U.S. PATENT DOCUMENTS

| | | | | |
|---|---|---|---|---|
| 2010/0001894 A1* | 1/2010 | Holly | ................... | G01S 7/02 |
| | | | | 343/810 |
| 2010/0265996 A1* | 10/2010 | Lim | ................... | H04B 7/15528 |
| | | | | 455/7 |
| 2010/0265997 A1* | 10/2010 | Eum | ................... | H04B 7/155 |
| | | | | 375/214 |
| 2011/0085477 A1* | 4/2011 | Schiff | ................ | H04B 7/15585 |
| | | | | 370/279 |
| 2015/0092636 A1* | 4/2015 | Rofougaran | ........... | H04B 1/403 |
| | | | | 370/281 |
| 2017/0023663 A1* | 1/2017 | Subburaj | ................. | G01S 7/032 |
| 2020/0028234 A1* | 1/2020 | Uemichi | ................... | H04B 1/52 |

OTHER PUBLICATIONS

Marki Microwave, Inc., GaAs MMIC Non-Linear Transmission Line, NLTL-6273-Rev C, Aug. 2019, 15 pages.

Barry Manz, Technology Survey: A Sampling of Radar ESM and ELINT Receivers, Dec. 2019, pp. 23-29, vol. 42 No. 12, JED: The Journal of Electronic Defense.

Cornwell et al., "Investigate Wideband Frequency Converters", Microwaves & RF, MWRF.com, Apr. 2016, Norwood, MA(pp. 90-92, 94 , 96 and 97).

* cited by examiner

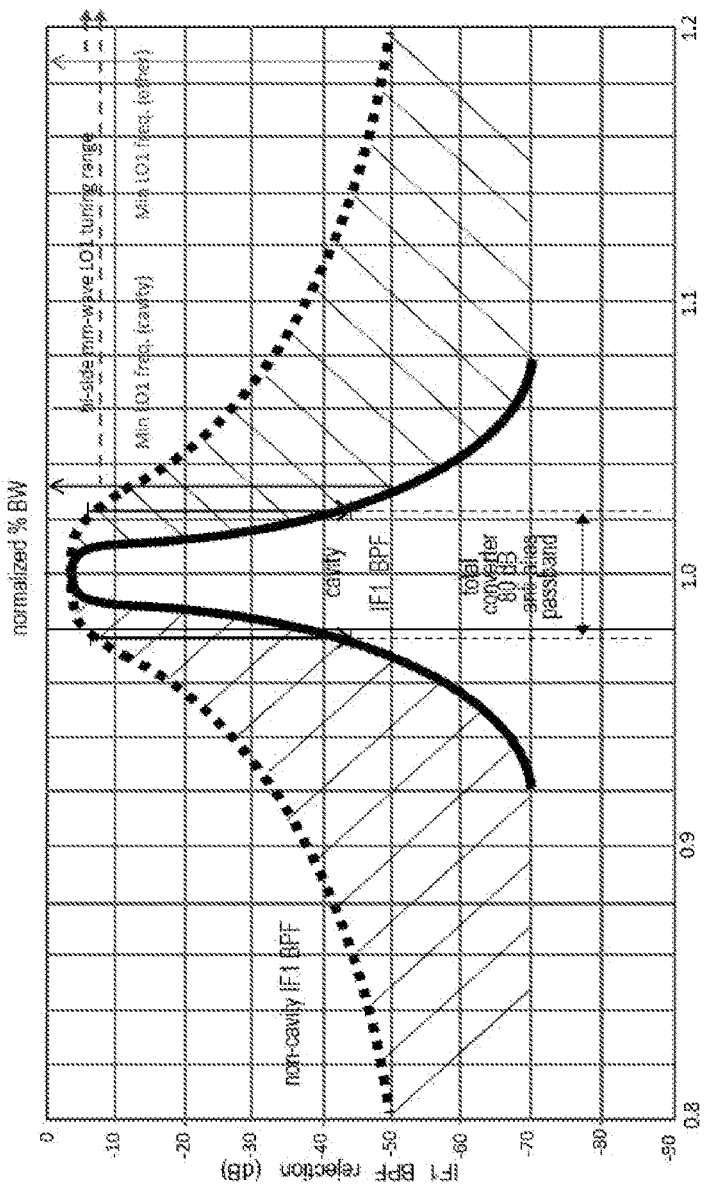
FIG. 2A
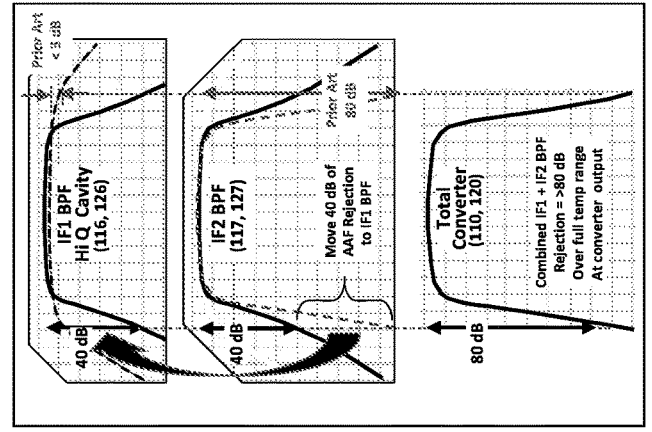
FIG. 2B
FIG. 2C
FIG. 2D

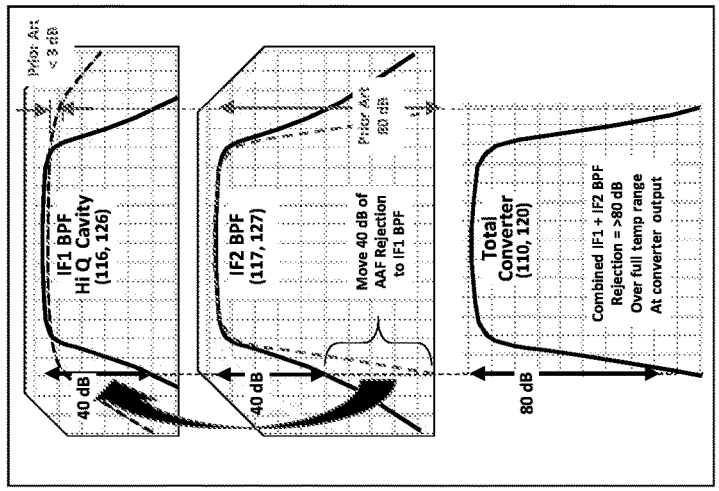
FIG. 2F
FIG. 2G
FIG. 2H
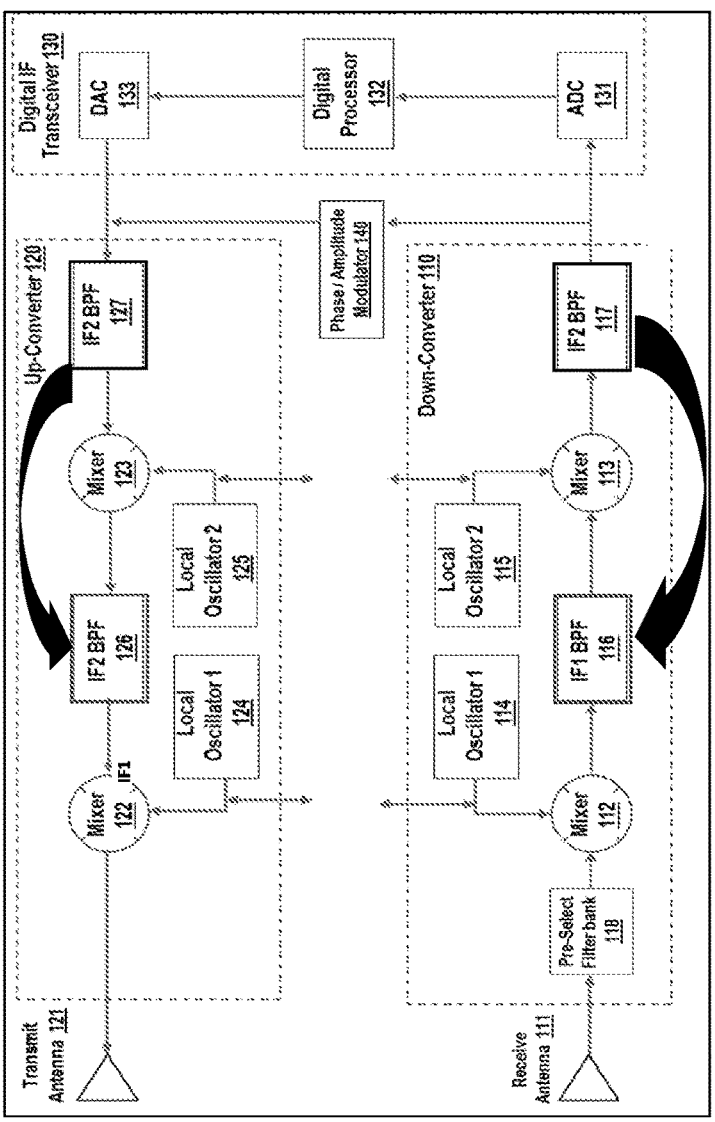
FIG. 2E

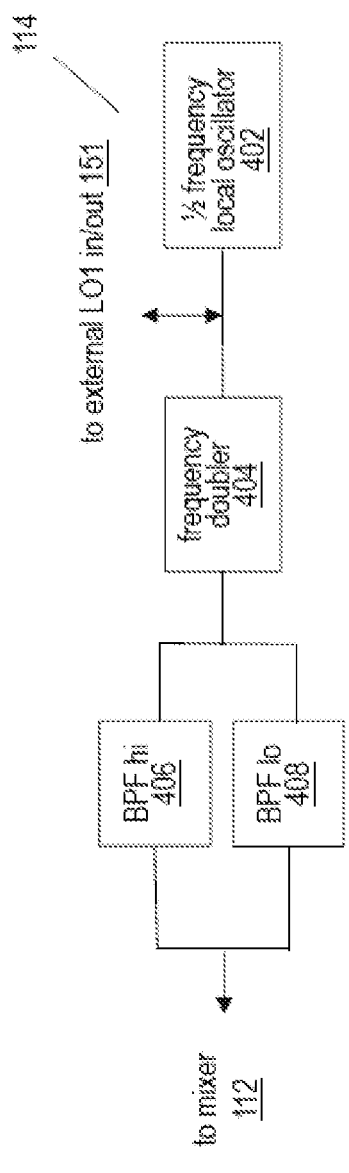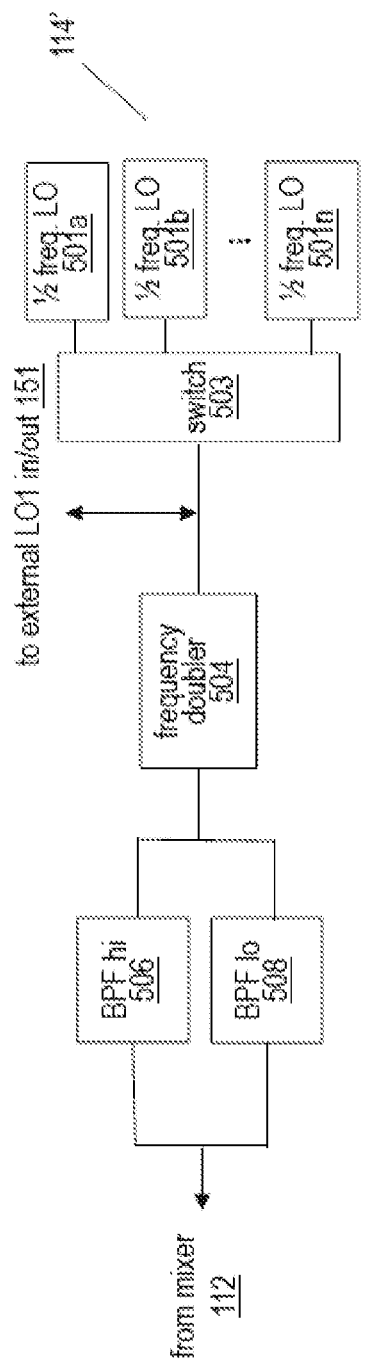

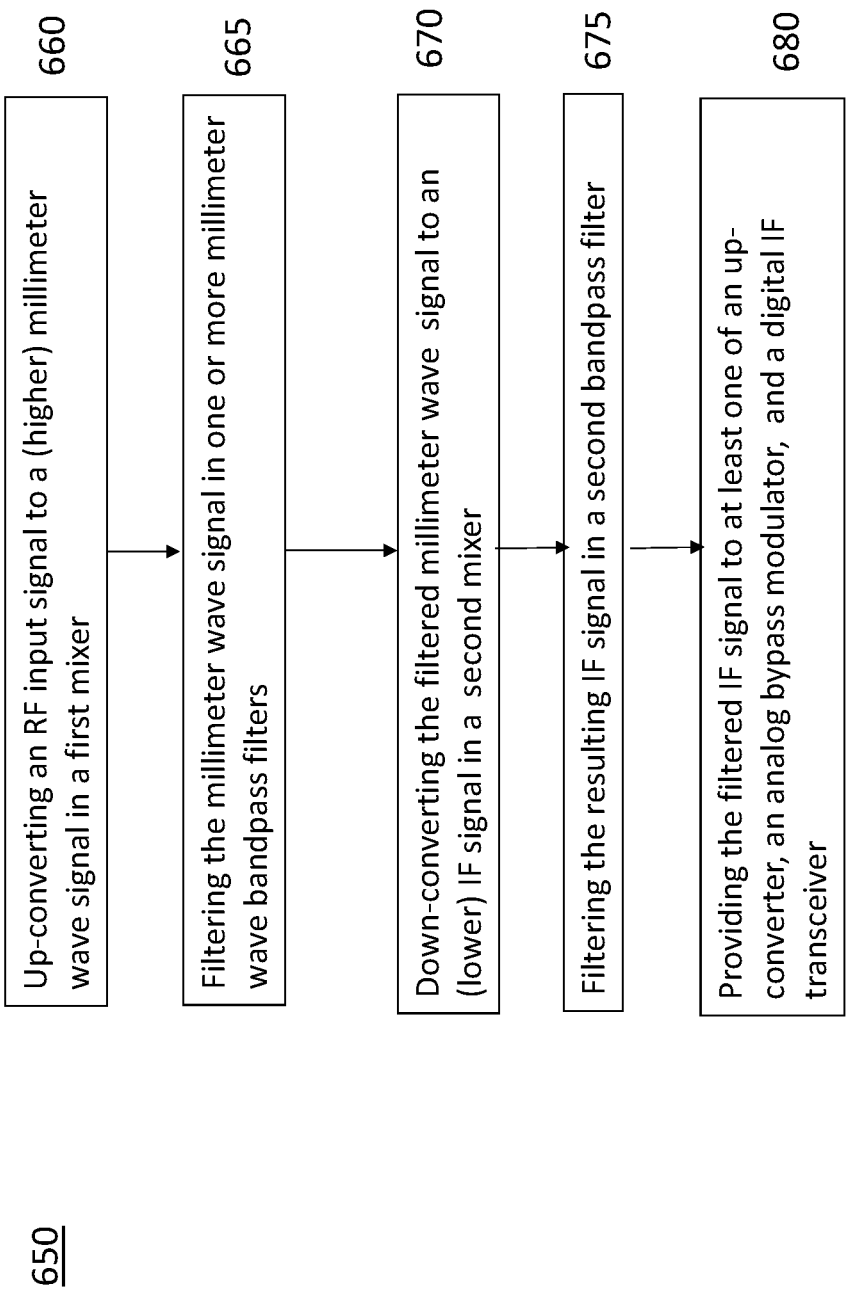

WIDE BAND TUNABLE TRANSCEIVER

CROSS-REFERENCE TO RELATED APPLICATIONS

This application claims the benefit of and priority to U.S. Provisional Application Ser. No. 63/001,179 filed Mar. 27, 2020, the contents of which is incorporated herein by reference.

FIELD OF THE DISCLOSURE

The present disclosure relates to wide band tunable transceivers in general, and in particular to a wide band tunable transceiver having a down-convertor and an up-convertor.

BACKGROUND

A transceiver typically includes a down-converter (or tuner), a digital transceiver, and an up-converter. The down-converter converts radio frequency (RF) input signals down to intermediate frequency (IF) signals (which are generally lower in frequency than the RF input signals) of a specific bandwidth and center frequency that correspond to one or more of the Nyquist frequency bands of an analog-to-digital converter (ADC). Similarly, the up-converter converts IF signals of a specific bandwidth and center frequency that corresponds to one or more of the Nyquist frequency bands of a digital-to-analog converter (DAC) up to the RF signals. These Nyquist frequency bands can be either baseband (in-phase and quadrature baseband) signals (whereby the tuner/up-converter has both an I (in-phase) and Q (quadrature) IF output/input), or single ended (whereby each of the tuner/up-converters has a single IF output/input). The single ended IF output/input of the tuner/up-converter is set to correspond to one or more of the Nyquist frequency bands of the ADCs and DACs. There may be various other elements such as filters and amplifiers to condition the signals.

A base-band (i.e., I and Q) converter is generally employed where the tuning range and instantaneous bandwidth of the converter is either fixed or is narrow relative to the frequencies of the incoming signals. Due to difficulties of maintaining phase and amplitude balanced over wide instantaneous bandwidths between the two separate analog I and Q signal paths feeding the ADC, a base-band converter is not readily suitable for applications where the instantaneous bandwidth and tuning range is relatively large compared with the received signal frequencies. For wider bandwidth converters, a singe-ended IF is typically employed to avoid any phase and amplitude imbalances by virtue of the I and Q signals being generated digitally inside a field-programmable gate array after the single-ended IF is digitized. Down-converters and up-converters can be of single conversion or double conversion types (and in some cases triple conversions or more). However, for wide band (multi-octave) tunable applications, a dual-conversion architecture is typically required.

There are many applications where size, weight, power and cost (SWAPC) are important. For example, the goal of most military implementations are to provide the best scalable and adaptable technology in the smallest form factor possible and at a reasonable cost. Meeting and satisfying these stringent requirements continues to be an extreme challenge especially as threat systems evolve their spatial, temporal and spectral coverage, in great part with the intended purpose of lowering the probability of Intercept (POI) and vulnerability to opposing Electronic Support Measure (ESM)/Electronic Warfare (EW)/Electronic Attack (EA) systems. Essentially there is a continuous evolving requirement for more and more Instantaneous Spatial/Temporal/Spectral/Dynamic Transceiver performance/coverage per unit SWAPC.

SUMMARY

The present disclosure is related to an improved transceiver having a down-convertor and an up-convertor that meets stringent spur-free Dynamic Range and Instantaneous Bandwidth performance requirements while satisfying SWAPC requirements. The present disclosure is also related to an improved receiver (having one or more down-converters), and/or an improved transmitter (having one or more up-converters) that also meets stringent requirements while satisfying SWAPC requirements.

One embodiment is a transceiver, comprising a down-converter for converting a radio-frequency (RF) input signal to an intermediate frequency (IF) signal with an analog low latency bypass path coupled to the IF signal and configured to provide a low latency IF signal. A digital path is coupled to the IF signal and configured to provide a digitally processed IF signal. There is an up-converter for converting at least one of the low latency IF signal and the digitally processed IF signal to an RF output signal.

In one example the transceiver digital path comprises an analog to digital converter, a digital signal processor and a digital to analog converter. The analog low latency bypass path in one example comprises a phase/amplitude modulator.

In one example a local oscillator sharing/distribution matrix provides at least one local oscillator signal for the down-converter and at least one local oscillator signal for the up-converter. The system may further comprise at least one further transceiver, coupled to the local oscillator sharing/distribution matrix.

In one example the down-converter and the up-converter convert to millimeter wave frequencies and filters the millimeter wave frequencies.

The transceiver in one example includes a first mixer coupled to the RF input signal and to a first local oscillator signal and provides a first millimeter wave signal. A first IF bandpass filter is coupled to the first mixer filtering the first millimeter wave signal and there is a second mixer coupled to a second local oscillator signal and to the first IF bandpass filter. A second IF bandpass filter is coupled to the second mixer and provides the IF signal to the analog bypass path and the digital path. A third IF bandpass filter is coupled to at least one of the low latency IF signal and the digitally processed IF signal. A third mixer is coupled to the third IF bandpass filter and a third local oscillator signal and providing a second millimeter wave signal. A fourth IF bandpass filter is coupled to the third mixer and a fourth mixer is coupled to the fourth IF bandpass filter and a fourth local oscillator signal, and providing the RF output signal.

According to one example, at least one of the first IF bandpass filter, second IF bandpass filter, third IF bandpass filter and fourth IF bandpass filter is a cavity filter. The cavity filter in one example comprises quartz. In a further example, the cavity filter is a bank of millimeter wave cavity filters of differing instantaneous bandwidths (IBWs) and wherein at least one of the first IF bandpass filter and the third bandpass filter includes switches for selecting at least one of the millimeter wave cavity filters. In one example the filter bank processes the RF input signal prior to the first mixer.

The first local oscillator signal in one embodiment is from a first local oscillator and comprises a half-frequency local oscillator, a frequency doubler, and at least two bandpass filters.

In one example a frequency of the first and second local oscillators are higher than a pass-band frequency of the first, second, third, and fourth IF bandpass filters.

One embodiment is an apparatus, comprising a down-converter for converting a radio-frequency (RF) input signal to an intermediate frequency (IF) output signal, wherein the down-converter comprises a first mixer and a second mixer with a first intermediate frequency (IF) bandpass filter connected between the first mixer and the second mixer, wherein a pass-band frequency of the first IF bandpass filter is higher than a frequency of the RF input signal, and wherein said first IF bandpass filter comprises one or more millimeter-wave cavity filters. A second IF bandpass filter is coupled to an output of the second mixer providing the IF output signal. A first local oscillator is coupled to the first mixer, wherein a first local oscillator frequency is higher than the pass-band frequency of the first IF bandpass filter, and a second local oscillator is coupled to the second mixer, wherein a second local oscillator frequency is higher than the pass-band frequency of the first IF bandpass filter.

The one or more millimeter-wave cavity filters in one example comprise quartz and can have an evanescent waveguide cavity design. In one example, the first IF bandpass filter includes switches for selecting one of the millimeter-wave cavity filters.

The first IF bandpass filter in one example is comprised of different varying instantaneous bandwidths (IBWs).

In one example an output from the second IF bandpass filter includes an IF center frequency between 100 MHz and 20 GHz. According to one example, at least one of the first IF bandpass filter and the second IF bandpass filter each has a minimum of 40 dB filter rejection.

At least one of the first IF bandpass filter and the second IF bandpass filter are configured to have a minimum of ½ of a total anti-alias filter rejection requirement of the converter.

The features and advantages described herein are not all-inclusive and, in particular, many additional features and advantages will be apparent to one of ordinary skill in the art in view of the drawings, specification and claims. Moreover, it should be noted that the language used in the specification has been selected principally for readability and instructional purposes and not to limit the scope of the inventive subject matter.

BRIEF DESCRIPTION OF THE DRAWINGS

The invention itself, as well as its modes of use, further objects, and advantages thereof, will best be understood by reference to the following detailed description of an illustrative embodiment when read in conjunction with the accompanying drawings, wherein:

FIGS. 2A-2D depict the pass-band and rejection profiles of the bandpass filters within the transceiver from FIG. 1C, according to one embodiment;

FIGS. 2E-2H depict the pass-band and rejection profiles of the bandpass filters within the transceiver from FIG. 1D, according to one embodiment;

FIG. 4 is a block diagram of a local oscillator application within the transceiver from FIGS. 1C and 1D, according to one embodiment;

FIG. 5 is a block diagram of a further local oscillator application, according to an alternative embodiment;

FIG. 6B is a flow chart perspective of the down-converter section of the transceiver system, according to an embodiment.

DETAILED DESCRIPTION

On embodiment of the disclosure relates to wide band tunable transceivers, and in particular to a wide band tunable transceiver having a down-convertor and an up-convertor having a digital intermediate frequency (IF) processing and a bypass analog modulation (digitally controlled) processing. In a further embodiment the transceivers can be scaled, stacked and interconnected. As used herein, the Radio Frequency (RF) generally means frequencies between 0-20 GHz and the term millimeter wave (mm wave) to generally mean any frequencies above 20 GHz.

Figure 1A:
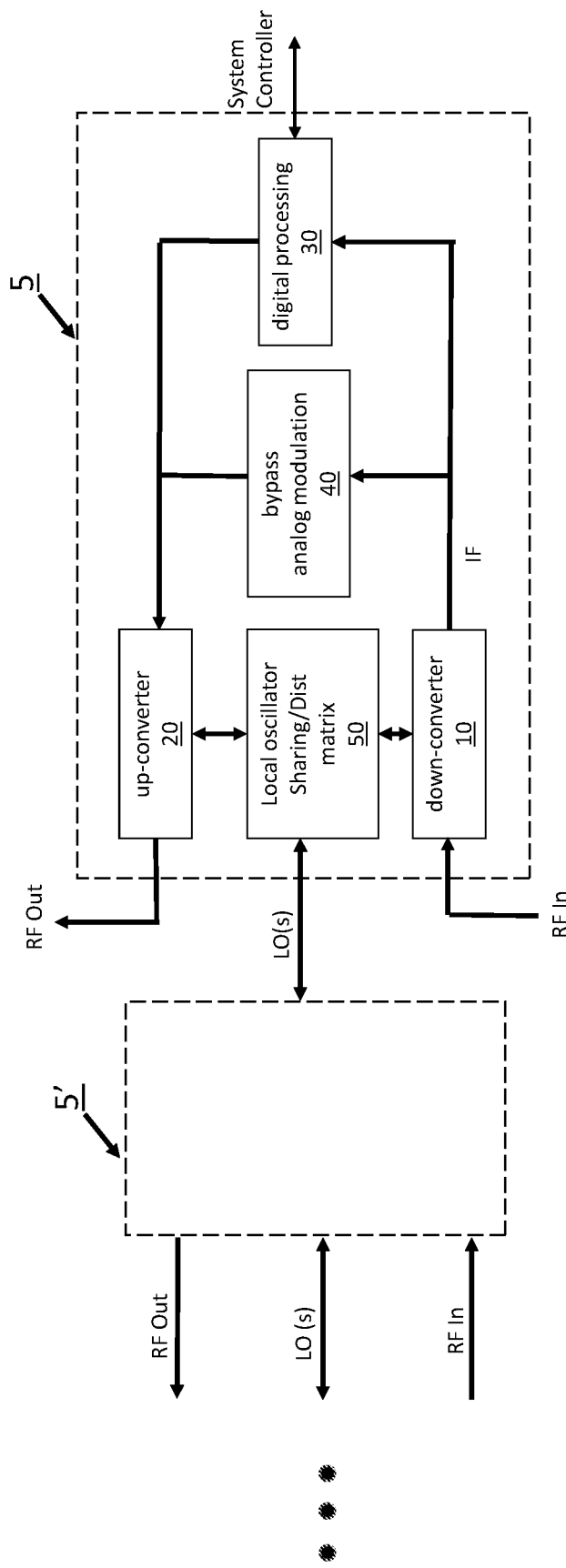
FIG. 1A is a block diagram of a wide-band tunable transceiver system, according to one embodiment.

Referring to FIG. 1A, a transceiver system is disclosed according to one embodiment. In this example, a transceiver 5 contains a downconverter 10 that receives a radio frequency (RF) input signal and outputs an intermediate frequency (IF) signal. The IF output of the down-converter 10 is an input to both a digital processing section 30 and a bypass analog modulation processing section 40. Depending upon the desired application or intent, the bypass analog modulation processing 40 provides a low latency IF signal that is faster than the signal derived from the digital processing 30. The combination of the low latency IF signal output with the benefits of the traditional digital signal processing provides unprecedented flexibility and responsiveness.

According to one embodiment, the control and decision-making can be done by controllers/processing capability in the down-converter or up-converter. In addition, the digital signal processing section 30 can control the operations via its processing capability. Furthermore, the digital signal processing section 30 can also communicate with the computers in the system that provide instructions.

In one example, there are multiple transceivers 5, 5' coupled together by the local oscillator matrix 50. In one example the transceivers 5, 5' are not equivalent and have different elements allowing for greater flexibility. For example, there can be multiple transceivers 5, 5' operating as receivers via the respective down-converter channels without any up-converters in order to operate as a receiver only system. For example, an antenna array can have multiple antenna elements and multiple downconverters can be processing signals for various functionality such as signal identification.

In an electronic warfare example, a signal can be a threat such that the bypass analog modulation processing section 40 can provide a faster response without the added delay from the digital processing stages.

Referring back to the full receiver (Rx) and transmission (Tx) transceiver configuration of FIG. 1A, the IF signal from the down-converter 10 is an input to both the digital processing section 30 and optionally to the bypass analog processing section 40. The digital processing section 30 performs the analog IF to digital conversion via analog to a digital converter section and digital signal processing before converting back to an analog IF signal via a digital to analog converter section. The digital output from the digital processing section 30 to the system controller can be the digitally processed signal for further processing at the system level. Typically, the system controller will provide for control/configuration/monitoring signals that are provided to the DSP 30 that can communicate to the rest of the elements including the down converter 10, upconverter 20, bypass analog modulation 40 and local oscillator/distribution matrix 50. In one example the system controller communicates with the DSP 30 and bypass analog modulation 40 for real time processing based on monitoring of higher level signal parameter metrics (provided to it by the DSP) in order to continually adjust the DSP 30, bypass analog modulation 40 and the downconverter 10, upconverter 20 and local oscillator sharing/distribution matrix 50 hardware settings for optimized system ESM and/or EA performance.

In the optional bypass analog processing section 40, a rapid analog processing provides an IF signal as an output with low latency. The output from the bypass analog modulation 40 and/or the digital processing section 30 in one example is an input to an up-converter 20 that generates the RF output. The local oscillator (LO) for the down-converter 10 and up-converter 20 in this example is provided by the LO sharing/distribution matrix 50. In a further embodiment, bandpass filtering is employed, wherein the bypass analog modulator 40 is between an IF1 BPF output of the down converter 10 and an IF1 BPF input of the up converter 20—essentially performing the low latency bypass at the IF1 stage versus the IF2 stage.

Figure 1B:
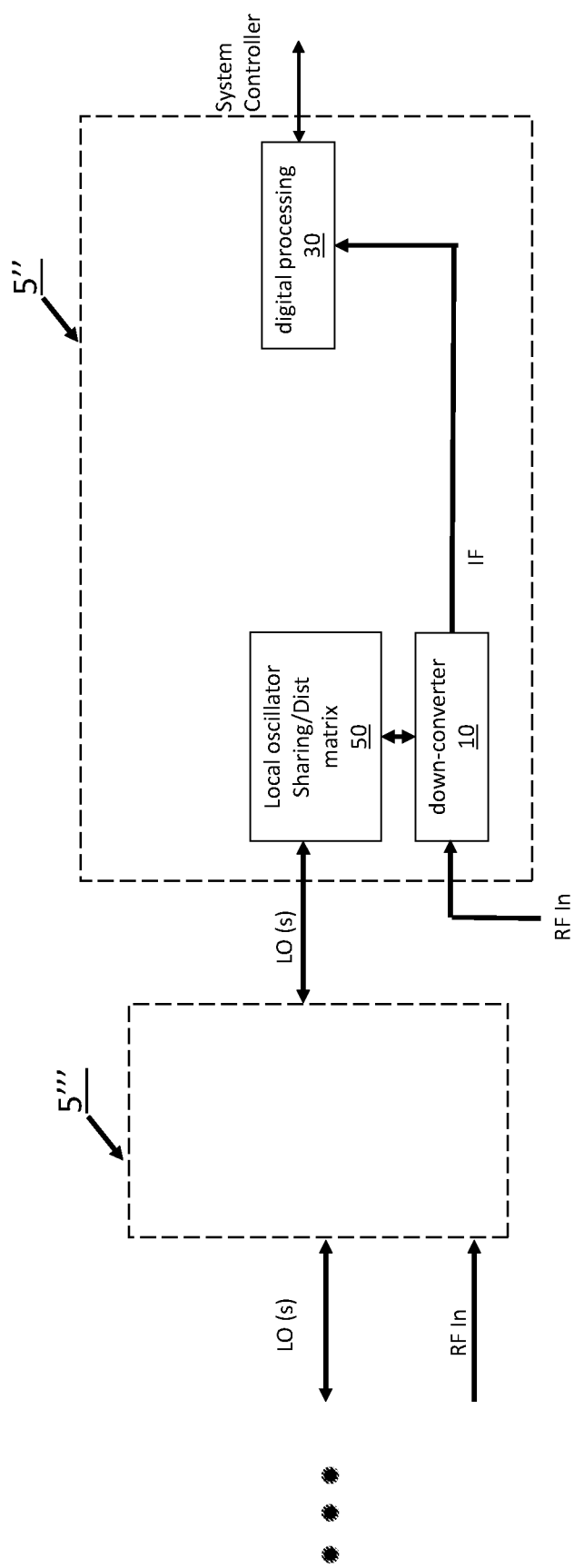
FIG. 1B is a block diagram of the wide-band tunable receive only system, according to an embodiment.

Referring to FIG. 1B, a further embodiment of the transceiver is depicted as RX only operation. In this example, the transceiver 5" comprises the down-converter 10 coupled to a local oscillator 50 for converting the RF input signal to an IF signal. The IF signal from the downconverter 10 is processed by the digital processing section 30 and produces the digital output to the system. In this example, the local oscillator 50 is part of the local oscillator distribution matrix 50 that can be coupled and shared among other downconverter stages 5'''.

The Rx only embodiment can be used to cover the ESM/ELINT/SIGINT Rx only systems that employ multiple down-converters and do for example, amplitude or phase based angle of arrival (AOA) measurements. This can also be done either without or with sharing of LO's for improved phase noise for optimal phase based AOA measurements.

Figure 1C:
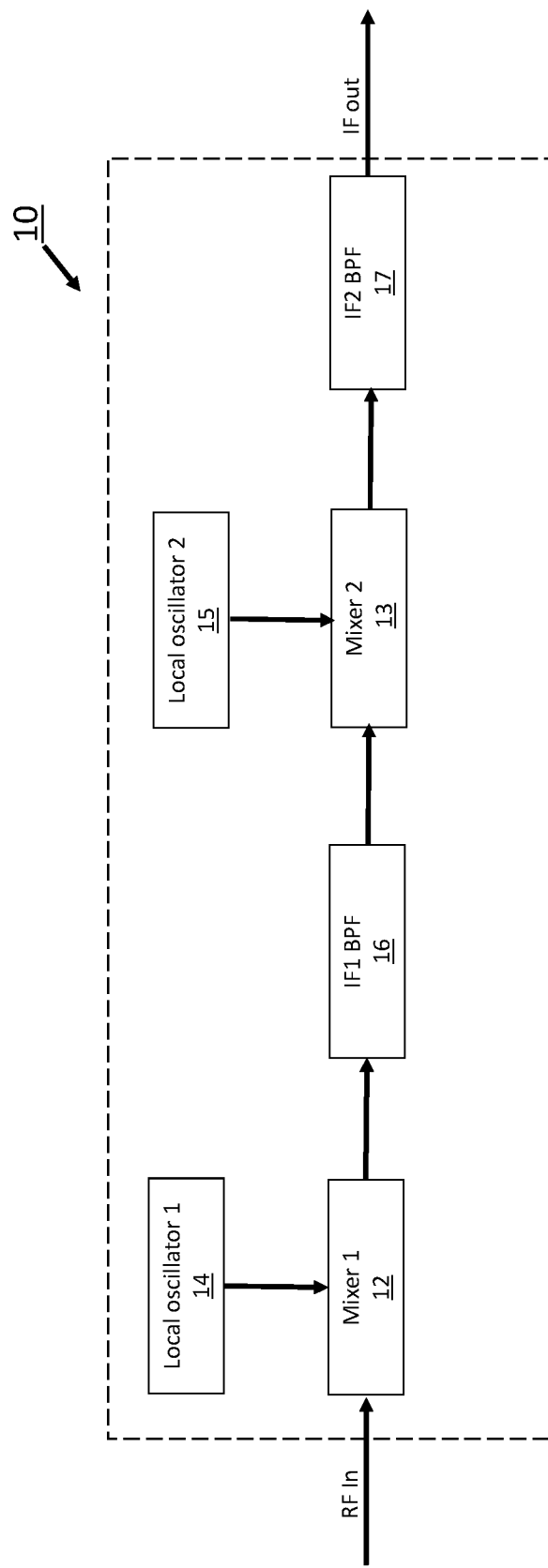
FIG. 1C is a detailed block diagram of the down-converter section for the wide-band tunable transceiver, according to one embodiment.

In FIG. 1C, the down-converter section 10 is shown and illustrates yet another embodiment that is detailed herein. The down-converter 10 includes a first mixer 12 coupled to a first local oscillator 14 to generate a mixer output at a frequency equal to RF Input+LO1 and being at a millimeter wave (e.g.: above 20 GHz) frequency in one example. The first IF BPF 16 in this example includes one or more cavity type filters and in one example the cavity filters are comprised of quartz (fused quartz or fused silica) for enhanced temperature stability (the criticality to achieve lowest SWAPC of which is further detailed below). Subcategories of cavity type filters include but are not limited to combline, interdigital, waveguide, loaded waveguide, substrate integrated waveguide (SIW) and dielectric resonator filter designs. The first IF BPF 16 can include a switching element to have a millimeter wave cavity filter bank as part of the down-converter 10. The filtered output from the first IF BPF 16 is an input to the second mixer 13. The second mixer 13 is coupled to a second local oscillator 15 and generates a down-converted IF output that is an input to the second IF BPF 17 and finally provides the IF out.

According to one down-converter example, the first intermediate frequency (IF) bandpass filter 16 has a pass-band frequency that is higher than the frequency of the RF input signal for the up-converted signal. In a further example, a first local oscillator frequency is higher than the pass-band frequency of the first IF bandpass filter 16. The second local oscillator 15 is coupled to the second mixer 13, wherein a second local oscillator frequency is higher than the pass-band frequency of the first IF bandpass filter 16.

While the down-converter section 10 operation was described herein, the up-converter section operates in the reverse manner and for convenience the description is not fully provided.

Figure 1D:
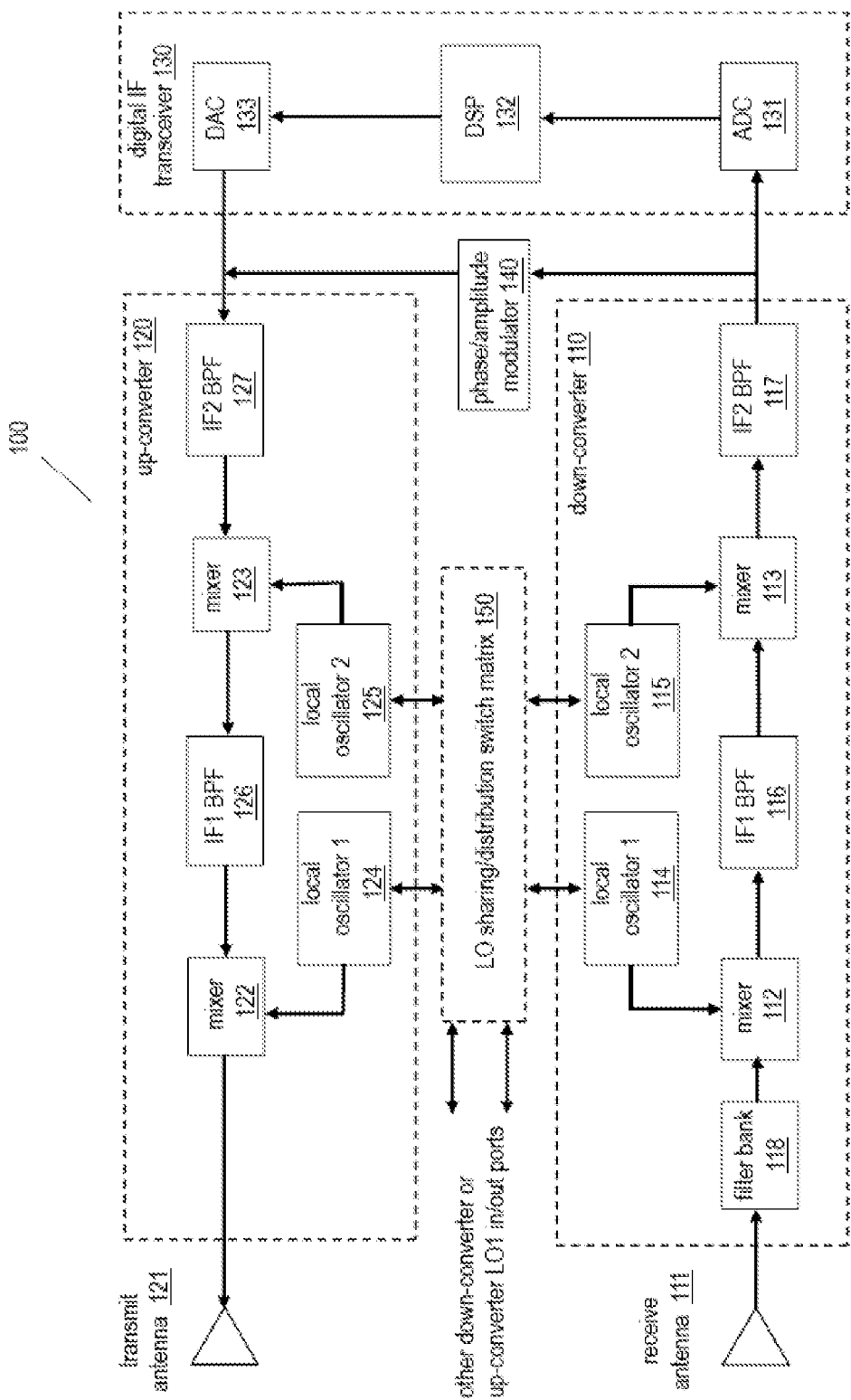
FIG. 1D is a detailed block diagram of the wide-band tunable transceiver system, according to one embodiment.

Referring now to the drawings and in particular to FIG. 1D, there is illustrated a detailed block diagram of the transceiver 100, according to one embodiment. As shown, a transceiver 100 includes a radio frequency (RF) to intermediate frequency (IF) down-converter section 110, an IF to RF up-converter section 120 and a digital IF transceiver (DIFT) 130. The analog IF output of down-converter 110 in one example is connected to the analog IF input of up-converter 120 via DIFT 130 and a digitally controlled phase/amplitude modulator 140. One purpose of an analog transceiver path going through phase/amplitude modulator 140 is to allow ultra-low latency modes without suffering digital delays inherent in DIFT 130. While the figure represents the phase/amplitude modulator 140 as a separate item, it may be co-located or integrated in the down-converter 110, up-converter 120, or DIFT 130. In one example the analog IF output of the downconverter 120 is simultaneously processed via the analog transceiver path 120 and the digital IF transceiver path 130. This allows for a rapid response from the analog path 120 and a processed but slower response from the DIFT 130. Alternatively, only one of the analog paths may be employed (either the phase/amplitude modulator 140 or the DIFT 130 path). A local oscillator (LO) sharing and distribution matrix 150 can be optionally added between down-converter 110 and up-converter 120, and/or between any combination of multiple down-converters and up-converters, the purpose of which is to allow the same LO signals to drive more than one channel, and to allow for maximum frequency and phase coherence among multiple (two or more) down and/or up converters. The LO signals for the mixer stages are either derived from the internal LOs or from/through the LO sharing/distribution Matrix 150.

Down-converter section 110 accepts a 0.1-20 GHz RF input from at least one receive antenna 111. Down-converter 110 in this example includes a pre-select filter bank 118, an RF to IF1 up-converting mixer 112, an IF1 to IF2 converting mixer 113, an LO1 114, an LO2 115, an IF1 bandpass filter (BPF) 116, and an IF2 BPF 117. Filter bank 118 partitions the 0.1 to 20 GHz multi-octave input RF frequency range into sub-octave sub-bands to reduce harmonics (spurious signals) generated by non-linearities of hardware components located between input antenna 111 and filter bank 118 and to reduce the magnitude of signals outside the instantaneous bandwidth (IBW) of down-converter 110. The LO1 114 and LO2 115 can be either phase-locked loop (PLL)/ voltage controlled oscillator (VCO), or direct digital synthesizer (DDS) designs, or combination PLL/VCO-DDS hybrids thereof.

According to one embodiment the RF input signal from the antenna 111 is filtered and then up converted from 0.1-20 GHz RF to 20-60 GHz millimeter wave signals via the first mixer 112 and the first local oscillator 114. The up-converted millimeter wave output from the mixer 112 is filtered by the first high Q cavity bandpass filter 116 with a particular instantaneous bandwidth (IBW) at a center frequency within the 20-60 GHz range. In one example the first cavity bandpass filter 116 comprises quartz material for maximum temperature stability at the higher millimeter wave frequencies in addition to a smaller physical filter size. In another example, the first cavity bandpass filter 116 is additionally comprised of an evanescent mode design for an even greater filter size reduction and minimizing the leakage of LO1 signals from coupling over/around the IF1 BPF (further reducing potential self-generated spurs). The millimeter wave signals from the first cavity bandpass filter 116 is then down-converted via second mixer 113 coupled to the second local oscillator 115. The IF output from the second mixer 113 is then filtered by the second bandpass filter 117 and provided to the digital IF transceiver 130 as well as the phase/amplitude modulator 140.

Up-converter section 120 provides an RF output to at least one transmit antenna 121. Up-converter section 120 includes IF2 bandpass filter 127, up-converter mixer 123 coupled to second local oscillator 125, IF1 bandpass filter 126, and down-converter converting mixer 122 coupled to the first local oscillator 124. The LO1 124 and LO2 125 can be either phase-locked loop (PLL)/voltage controlled oscillator (VCO), or direct digital synthesizer (DDS) designs, or combination PLL/VCO-DDS hybrids thereof. It should be understood that additional amplifiers and filters may be employed.

Continuing reference to up-converter 120 depicted in FIG. 1D, according to one embodiment the IF input signal from the digital IF transceiver 130 or the phase/amplitude modulator 140 is filtered by the IF2 bandpass filter 127. The filtered IF signal is then up-converted from IF to millimeter wave frequency via the mixer 123 and the local oscillator 125. The up-converted millimeter wave output from the mixer 123 is then filtered by the high Q cavity first bandpass filter 126 with a particular instantaneous bandwidth (IBW) at a center frequency within the 20-60 GHz range. In one example the first bandpass filter 126 comprises of quartz material for maximum temperature stability at the higher millimeter wave frequencies. In another example, the first cavity bandpass filter 126 is additionally comprised of an evanescent mode design for an even greater filter size reduction and minimizing the leakage of LO1 signals from coupling over/around the IF1 BPF (further reducing potential self-generated spurs). The millimeter wave signal output from the IF1 bandpass filter 126 is then down-converted via mixer 122 and the local oscillator 124 to an RF output (eg: 0.1-20 GHz). The RF output from the mixer 122 is then output to the transmit antenna 121. The LO signals for the mixer stages are either derived from the internal LOs or from/through the LO sharing/distribution Matrix 150.

DIFT 130 in this example includes an analog-to-digital converter (ADC) 131, a digital signal processor (DSP) 132, and a digital-to-analog converter (DAC) 133. The DITF 130 is coupled to the output of IF2 BPF 117 of the downconverter section 110 as an input. The analog IF2 signal from the down-converter is converted to a digital IF2 signal by the ADC 131 when processed via a digital path. The digitized IF2 signal is then processed by the DSP 132 that performs various processing on the narrow-band (anti alias bandwidth) digitized IF2 signals. DSP 132 in one example processes raw digital IF2 signals and/or internally creates equivalent digital baseband I and Q signals through DSP functions such as a Hilbert transform. The processed digital IF2 signals and/or other self/internally-generated digital signals from the DSP is then converted back to an analog IF2 signal by the DAC 133, which is then used as an input to the up-converter 120.

Since up converter 120 operates essentially in the same manner as down converter 110 but just in reverse, only down converter 110 will be further described in detail. Down-converter 110 provides an IF2 output having an IBW and center frequency that can be configured to operate essentially anywhere between 100 MHz and 20 GHz. The IBW and center frequency output from the down-converter is set to match the instantaneous processing bandwidth (and IF center frequency) of DIFT 130 and/or all-analog phase/amplitude modulator 140 employed. Essentially, any desired instantaneous bandwidth (typically also referred to as the anti-alias bandwidth) within a 0.1 to 20 GHz range of RF inputs to down-converter 110 signals can be converted down to an equal IBW within a 0.1-20 GHz range of IF2 outputs. The primary practical limit to a wide band transceiver's instantaneous processing bandwidth is the IBW capabilities of ADC 131, DSP 132, and DAC 133 components within DIFT 130. One benefit/improvement of the present configuration is that it allows the same converter architecture/design/hardware to be configured to operate with (match the operating frequencies and IBWs of) legacy narrow-band DIFTs, existing/current moderate band DIFTs, and future wide and ultra-wide bandwidth DIFTs, as the state of ADC, DAC, and DSP technology evolve.

The analog IF2 output of down-converter 110 is connected to the analog IF2 input of up-converter 120 via DIFT 130. The analog IF2 output of down-converter 110 is also connected to the analog IF2 input of up-converter 120 via a digitally controlled phase and amplitude modulator 140. The purpose of all-analog transceiver path via the phase/amplitude modulator 140 is to allow ultra-low latency modes without suffering time delays inherent is any/all digital processes. This low latency analog bypass path in one example provides for rapid processing to the up-converter 120 and a fast transmission response, typically on the order of "10's of nanoseconds". In one embodiment, the output from the downconverter 110 is routed to both the low latency analog path through the phase/amplitude modulator 140 as well as to the DIFT 130 to allow for a fast response and also a more fully processed response. This provides greater and more optimized resource management and concurrent processing.

In a typical transceiver operating mode, down-converter 110 and up-converter 120 are both tuned to the same RF center frequency and instantaneous bandwidth. This is accomplished by commanding LO1s 114, 124 and LO2s 115, 125 in both converters 110, 120 to the same frequencies respectively, or alternatively by having the LOs of one of converters 110, 120 feeding the other converter's LOs via LO sharing/distribution matrix 150. In general, maximum frequency and phase coherence is maintained between any two or more channels (in this case down-converter 110 and up-converter 120) when their respective LO1s 114, 124 and LO2s 115, 125 are driven from the same/exact frequency sources. There are other operating modes where downconverter 110 is commanded to a different RF center frequency and/or different instantaneous bandwidth than that of up-converter 120.

DSP 132 performs various functions on the narrow-band (anti-alias bandwidth) digitized IF2 signals. DSP 132 may process raw digital IF signals and/or internally create equivalent baseband I and Q signals through DSP functions such as a Hilbert transform. The embodiments depicted in FIGS. 1A-D employs single-ended analog IF2s (versus analog baseband IF2s) because a) simpler hardware can be used to employ the low latency path modes and b) it is harder to maintain low phase and amplitude offsets between analog I and Q paths over wider instantaneous bandwidths as previously noted.

The wide-band RF input and output frequencies of the converters described herein are intended to cover RF signals contiguously from roughly 100 MHz to 20 GHz. However, it is understood by those skilled in the art that the present embodiment can be extended to cover lower and/or higher RF and/or IF2 input/output frequencies. For example, scaling the entire frequency plan to cover input/output RF ranges including 0.1 to 25, 30 or higher GHz would be fairly straight-forward. In general, wide band tunable converters have a practical lower RF operating limit of 1, 30, 100, 300 MHz, 1 GHz or higher, depending on the required total contiguous RF tuning range, instantaneous bandwidth(s), instantaneous spur free dynamic range (ISFDR), noise figure, and size, weight, power, and cost (SWAPC) requirements and/or constraints on the hardware. The cumulative improvements described herein achieves an unprecedented combination of the widest RF frequency coverage, widest IBW(s), best ISFDR and NF, at the lowest size, weight, power, and cost. In other words, a major improvement in transceiver performance per unit SWAPC.

For the purposes of the detailed descriptions herein, The IF1 frequency ranges are defined as the intermediate frequencies that are located (occurring) along the conversion paths that are on the opposite side of mixers 112 and 122 and closest to antennas 111 and 112, respectively. The IF2 frequency ranges are defined as the intermediate frequencies that are located (occurring) along the conversion paths that are on the same sides of mixers 113 and 123 and closest to DIFT 130.

In general, for a dual super-heterodyne converter architecture, the pass-band frequencies of IF1 BPF 116 can be either lower (low-side) or higher (high-side) than the RF inputs from receiver antenna(s) 111. In order to tune over such a broad range of RF frequencies (nearly 20 GHz of coverage) while maximizing ISFDR and NF performance, and to limit the maximum operating frequencies of local oscillators, conventional converters have typically had to employ a combination of multiple high-side and low-side RF to IF1 conversion paths, requiring multiple mixers, BPFs, amplifiers, etc., resulting in much higher SWAPC hardware. For each separate first conversion path, this necessitates a separate second conversion path to bring each IF1 BPF center frequency down to the same IF2 center frequency. Additionally, due to rejection limitations of wide bandwidth IF1 BPFs and limitations in filtering out self-generated conversion spurs over such a broad tuning range, conventional converters have historically required the majority (essentially all) of the converter's 80 dB total anti-alias bandwidth rejection requirements to be placed on (carried by) the IF2 BPF's 117 and 127 (also referred to as the converter's anti-alias filter).

Some conventional converters employ both an IF2 BPF followed by a separate anti-alias filter (AAF) in order to achieve the necessary rejection. The combination of the IF2 BPF's 117, 127 lower center frequency, higher percentage bandwidth and very high rejection requirement results in a relatively very large sized IF2 filter. In contrast, the present system achieves a major SWAPC reduction by employing a single hi-side (filter frequency that is above the RF input frequency's) high-Q cavity IF1 BPF and a high-side (LO frequency is above that of both the RF input and IF2 BPF pass-band) wide-band tunable LO1 providing both improved rejection and reduced self-generated conversion spurs such that a significant amount of the converter's total (for example 80 dB) AAF rejection can be moved off the larger lower frequency IF2 BPF (and/or AAF) and onto the smaller mm-wave IF1 BPF. As an example, the converter's total AAF rejection can be 80 dB while in other examples it can be 40 dB, 50 dB, 60 dB or 70 dB. In one embodiment, as depicted in FIGS. 2A and 2E, one half, or approximately 40 dB of the converters total 80 dB AAF rejection amount is intentionally "absorbed" by the IF1 Cavity BPF and thereby also allowing the IF2 BPF to be a much smaller size and cost.

In general, for any mixer conversion process, the operating frequencies of the local oscillator driving the mixer can be either lower or higher than the pass-band of the IF BPF connected to the output of the mixer. For one embodiment the operating frequencies of LO1 114 and LO2 115 are higher than the pass-band frequencies of the IF1 BPF 116 and IF2 BPF 117. The benefit of operating with high-side LO1 114 and LO2 115 is that the operating frequencies of LO1 114 and LO2 115 are not operating at any of the same frequencies of the RF input nor IF2 output, which greatly minimizes the impacts of the internal LO signals coupling onto the RF to IF1 to IF2 conversion path. Additionally, employing much higher frequency millimeter-wave LO minimizes component sizes (primarily filters) and allows a single LO1 source to be used over a wide tuning range by virtue of reducing the percent bandwidth of its 20 GHz tuning range (20 GHz tuning range can still be sub-octave when operating up at mm-wave frequencies).

Down-converter 110 has a first conversion section (converting 0.1-20 GHz RF to 20-60 GHz IF1) that employs a high-side mm-wave IF1 BPF 116 in addition to a high-side mm-wave wide-band tunable LO1 114. This helps minimize unwanted RF and LO1 signals from passing through the IF1 BPFs 116 pass-band. The benefits of Hi side LO and IF1 is a first step and by having this done "through" the filter versus later defines the cavity having the added benefit of minimizing RF and LO1 signals from getting "around" the filter since the cavity has a waveguide equivalent "cut off" which helps keep LO1 signals from getting "around" the IF1 BPF and getting over to and mixing with LO2 signals which can result in LO1-LO2 spurs getting into the AAF pass-band. The conventional systems employ 2 IF1 BPF's and LO2s as compared to a present embodiment that only uses one.

Down-converter 110 has a second conversion section (converting 20-60 GHz IF1 down to 0.1-20 GHz IF2), that employs a low-side lower frequency (RF—below mm-wave) IF2 BPF 117 in addition to a high-side mm-wave fixed frequency LO2 115. By virtue of minimizing unwanted input (externally generated) and self-generated LO signals from getting through the IF1 and IF2 bandpass filters, this combination greatly contributes to maximizing the ISFDR of down-converter 110. When combined with the particular IF1 and IF2 BPF improvements detailed in the subsequent paragraphs, this allows a single RF to IF1 to IF2 conversion path to cover the entire 0.1 to 20 GHz RF input frequency range, and place a desired IBW at any center frequency within a 0.1 to 20 GHz IF2 range, while minimizing the SWAPC of the hardware.

The present embodiment achieves significant improvements in both electrical performance (RF tuning range, IBW, ISFDR, NF, etc.) and SWAPC by employing a high-side mm-wave IF1 BPF 116, LO1 114 and LO2 115 frequency conversion plan, employing specific inter-related improvements to the IF1 and IF2 BPFs 116, 117, and optionally employing specific improvements to wide-band tunable LO1 114, the details of which are described herein.

Historically, in order to achieve optimal converter electrical performance, limitations in the rejection levels, size, percentage bandwidth, and insertion loss (i.e., Q) of higher frequency RF broad-band IF1 bandpass filters have driven prior-art wide-band tunable converters to employ more than one conversion path to cover many octaves of RF frequencies, thus requiring many more components (higher SWAPC). In high performance wide-band tunable converters, in order to minimize all self-generated conversion spurs, even employing a relatively spectrally clean high-side mm-wave IF1 BPF/LO1/LO2 conversion plan (as previously described) but with typical BPFs will still require multiple (at least two) IF1 BPFs (and switches to swap between them), each at a different center frequency (same IBW) and then with each path requiring a different LO2 115 frequency in order to bring each second conversion path down to the same final center frequency and IBW at the converter's IF2 output. These multiple paths add to the complexity and SWAPC of both the conversion paths and the LO2 115 design either by needing to be tunable (verses fixed) or by needing more than one fixed frequency source switched in to drive mixer 113. This is still in addition to, as previously noted, the essentially all of a wide-band tunable converter's total anti-alias bandwidth rejection requirements (typically 80 dB) having historically been placed on (carried by) the lowest frequency IF2 BPF 117, which at lower operating frequencies, results in a much larger sized IF2 BPF 117.

Referring to FIGS. 1A, B and D, a further optional feature is the LO sharing and distribution matrix 150 that allows LO1s 114, 124 and LO2s 115, 125 from any two or more converters (any combination of down-converters or up-converters) to be available for driving each other's LO signals. This improvement also allows for gang-tuning of multiple channels all to the same frequency and with maximum phase and frequency coherence. LO sharing and distribution 150 switch matrix together with the above-mentioned N-way LO1 also provides for upwards of 2×N pre-set frequencies to rapid tune transceiver 100. LO sharing and distribution switch 150 can also be expanded to accommodate more than 2 channels, for example 3, 4, 5, or M channels, providing the cumulative multi-channel hardware to provide upwards of N×M pre-set frequencies across which to rapid tune channels.

FIGS. 1A, B, and D also show an additional improvement whereby the output of down-converter 110 IF2 output can be routed to the up-converter 120 IF2 input, via the low latency analog path from the phase/amplitude modulator 140 thereby by-passing DIFT 130 in order to directly superimpose/add amplitude and phase modulation to transceiver 100 with low latency as compared to processing through the DIFT 130. This improvement provides an optional configuration for ultra-low latency transceiver modes where latencies as low as 10's of nanoseconds may be required. This mode is referred to as a low-latency DIFT bypass mode or low latency bypass mode.

With reference now to FIG. 2A-2D, there is depicted the pass-band and rejection profiles of IF1 BPF 116 and IF2 BPF 117 within down-converter 110 or up-converter 120 from FIG. 1D. In addition to the previously described employment of a hi-side mm-wave IF1 BPF, LO1 and LO2 conversion plan, down-converter 110 in one example employs a mm-wave cavity type IF1 BPF 116 with an out-of-band rejection being upwards of 40 dB better (at the converter anti-alias pass-band points) than other filter types historically employed after the first conversion stage of a dual stage converter (see comparison plot of cavity versus other filter's rejection performance referred to as the non-cavity IF1 BPF represented by dotted lines). The improved rejection provided by a cavity type filter is so significant that it enables IF1 BPF to achieve levels of rejection typically achieved by and allocated to the lower frequency (and much larger) IF2 BPF 117 or AAF. Thus, mm-wave cavity IF1 BPF 116 is able to absorb a significant amount of the converter's 80 dB total anti-alias rejection requirement, greatly reducing the IF2 BPF 117 rejection requirement and thus both its size and cost. In this example embodiment, as depicted in FIGS. 2A and 2E, roughly half or 40 dB of the 80 dB rejection previously allocated to the IF2 BPF 117 is moved off of the lower frequency IF2 BPF 117 and onto mm-wave cavity IF1 BPF 116. Additionally and specifically, the roughly −40 dB rejection pass-bands of both IF1 BPF 116 and IF2 BPF 117 are purposely closely matched and overlapped in one example such that the combination of their individual rejections combine (superimpose) to achieve the same net final 80 dB rejection level for total converter 110.

As discussed herein, conventional converters have placed most of the full anti-alias rejection burden (e.g., 80 dB) of the converter on the final conversion stage's low frequency IF2 BPF 117 (and in some cases adding a subsequent dedicated anti-alias filter). Since lower frequency filters are larger in general than higher frequency filters, this logically results in a physically large, harder to design and thus more expensive IF2 BPF 117. In contrast, converter 110 allows for a 40 dB reduction in the lower frequency IF2 BPF 117 rejection requirement, which greatly reduces its complexity, size and cost by upwards of ten-fold smaller, depending on the type of filter employed in that position. A lower SWAPC IF2 BPF 117 greatly contributes to a much lower SWAPC converter.

While cavity type filters represent the highest Q filter's achievable (lowest pass-band insertion loss+best out of pass-band rejection), their applicability to smaller SWAPC transceivers has historically been impractical by virtue of their inherently much larger size as compared to other types of filters. However, converter 110 offsets the much larger filter size of cavity IF1 BPF 116 by having the pass-band frequencies of IF1 BPF 116 being in the mm-wave frequency range (such as >20 and <60 GHz). This also greatly contributes to a much lower SWAPC converter.

In addition to a major size reduction, the employment of a hi-Q mm-wave cavity IF1 BPF 116 results in a given IBW centered at the mm-wave center frequency to represent a much smaller percent bandwidth, which in turn, together with the hi-side IF1/LO1 frequency plan, allows converter 110 to support much wider and more numerous IBWs without changing the converter design/architecture. Moreover, this enables converter 110 to support essentially any IBW (from as little as LOs of MHz to upwards of many GHz) through the simple swap out (selection) of IF1 BPF 116, IF2 BPF 117 and changing the fixed LO2 115 frequency. Further, by virtue of the subject improved converter being able to support essentially any IBW with a single RF to IF1 to IF2 path and same LOs, this easily enables the alternative/optional improved embodiment of converter 110 employing two or more IF1 BPFs, each having differing IBWs all centered at the same IF1 center frequency, thus enabling software-selectable IBWs all in the same hardware. In contrast, changing the IBW of conventional converters typically required major changes in the frequency conversion plan and thus significant amount of its components.

As depicted in FIGS. 2A and 2E, the improved rejection of the cavity IF1 BPF 116 versus non-cavity conventional filters is so significant, and resulting in the rejection of so many more self-generated conversion spurs, that it enables the subject converter to need only a single RF to IF1 to IF2 conversion path, greatly reducing the SWAPC of the converter hardware. This in turn results in excess SWAPC to be reallocated to adding simultaneous software-selectable IBWs all in the same converter hardware. Essentially, multiple IF1 BPFs 116 previously employed in conventional systems to mitigate spur generation issues are now able to be reallocated to allow the converter to provide multiple selectable IBWs. The resulting excess SWAPC may also be reallocated to other additional features such as adding simultaneous software selectable LO1s all in the same hardware (as will be described elsewhere).

An additional benefit of employing a cavity filter is that its narrow physical width greatly reduces the ability of signals present on the input end of the cavity filter to go around the exterior of the filter and couple back onto the signal path at the output end of the cavity filter. The phenomena of signals "getting around" a filter is sometimes referred to as "blow-by" and employment of the cavity filter greatly reduced the "blow by" factor. For the particular mm-wave Hi Side LO1/LO2/IF1 frequency plan, the amount of "blow by" can greatly impact the ability to keep unwanted mixing products between the mm-wave LO1 and mm-wave LO2 signals from getting into the IF1 BPFs of the converter. The benefit of employment of cavity type filters is also described in relation to the BPF hi and BPF lo in the LO1 designs as described below.

As further depicted in FIGS. 2A and 2E, for any high-side IF1 BPF 116 and high-side LO1 114 based converter, the lowest RF input frequency that converter 110 can be tuned down to is primarily limited to how close the first conversion stage's LO1 114 frequency can be placed towards IF1 BPF 116's pass-band (in this case, the upper pass-band edge—it would be the lower pass-band edge for a low-side LO1) before its LO1 signal starts to bleed into (allowed to pass through) IF1 BPF 116's pass-band, whereupon the LO1 signal itself creates a converter self-generated spur, thus reducing converter 110's ISFDR. As depicted, employment of a non-cavity IF1 BPF 116 has historically limited the lowest RF tune frequency of wide band converters to GHz or at best many hundreds of MHz.

However, as depicted in FIGS. 2A and 2E, the superior rejection of cavity IF1 BPF 116 over a non-cavity conventional filter's rejection is so significant, that it enables the hi-side mm-wave LO1 114 frequency to be tuned much closer to the upper rejection edge of IF1 BPF 116. This allows converter 110 to be tuned down to RF frequencies as low as 100 MHz, depending on the IBW of IF1 BPF(s) 116 employed. In one example, the frequency plan is scaled down further, to for example be able to tune down as low as 30 MHz, depending upon the desired frequency coverage in one converter path.

Given the much higher mm-wave operating frequencies of IF1 BPF 116, minimizing the amount of temperature drift of that filter's pass-band (typically defined at the −3 dB points) and most especially its −40 dB rejection band points is important to having it properly and consistently match/overlap with and maintain the same pass and rejection bands of the lower frequency IF2 BPF 117. As depicted in FIGS. 2A and 2E, in order to minimize the movement of IF1 BPF 116 pass/rejection points over temperature, the subject converter may employ a mm-wave cavity IF1 BPF 116 constructed using a higher dielectric and with a temperature stability material such as quartz. Since IF2 BPF 117 is already at a much lower frequency (on the order of ten times lower in frequency than IF1 BPF 116), the temperature stability (parts per million per degree Celsius) performance of IF2 BPF 117 is less critical, and thus the particular type, design and material allowed for use for IF2 BPF 117 is less relevant. Quartz's roughly 5 parts per million (PPM) per degree Celsius stability at 20-60 GHz equates to only 10-30 MHz total rejection point movement respectively over 100 degrees of total temperature change. Having less pass/rejection band movement/drift over temperature greatly helps to keep IF1 BPF 116 less complex, easier to design/build/fab and thus higher yield, lower cost by not having to build-in more bandwidth design margin to compensate for temperature variations, etc. Additionally, the higher 3.8 $E_r$ dielectric constant for quartz allows the mm-wave cavity IF1 BPF 116 to be a smaller size as compared to air-dielectric cavity filters. This in turn also contributes to freeing up more space to either make the converter even smaller and/or fit multiple IF1 BPFs for multiple IBWs and/or multiple ping-pong LO1's, as described herein.

To further reduce the SWAPC of IF1 BPF 116, this mm-wave cavity filter can be designed to operate in an evanescent (non-propagating, below waveguide cut off) mode versus a conventional/normal propagating waveguide mode. Although the up-front engineering, design and modeling of an evanescent mode is more difficult than a standard cavity waveguide propagating mode, the improvement to the transceiver 100 using the evanescent (versus normal propagating) mode is that it results in a smaller filter size (for example, as much as 70% smaller). This in turn also contributes to freeing up more space to either make transceiver 100 even smaller and/or allow the addition of more IF1 BPFs for multiple IBWs and/or multiple ping-pong LOs, as described herein.

Figure 3:
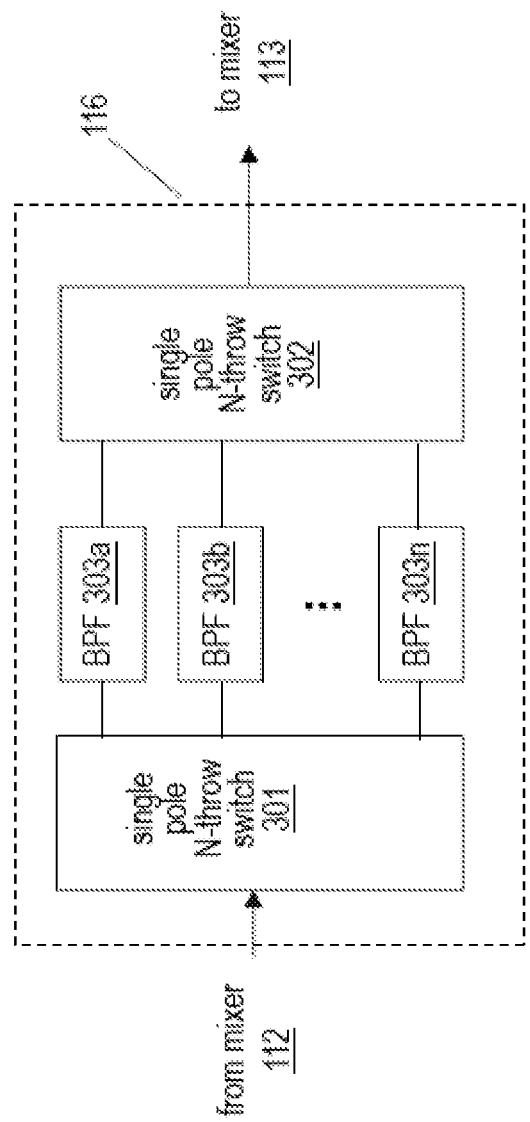
FIG. 3 is a block diagram of an N-stage IF1 bandpass filter within the transceiver from FIGS. 1C and 1D, according to one embodiment.

Referring now to FIG. 3, there is illustrated a block diagram of IF1 BPF 116, according to one embodiment receiving mm-wave signals from the first mixer 112 and providing the filtered mm-wave output to the second mixer 113. As shown in this alternative embodiment, IF1 BPF 116 includes one or more mm-wave cavity BPFs, such as a first mm-wave cavity BPF 303a having a first bandwidth, a second mm-wave cavity BPF 303b having a second bandwidth and an $N^{th}$ mm-wave cavity BPF 303n having an $N_{th}$ bandwidth. The one or more BPFs 303a-303n located between two single-pole N-throw switches 301 and 302, which constitutes essentially an N-way software-selectable filter bank. Each of mm-wave cavity BPFs 303a-303n in this example are centered at the same frequency such that it does not require any changes to any of the converter elements already needed for a single IF1 BPF 116 embodiment. While centered around the same center frequency, each bandpass filter can have varying pass-band ranges allowing for different IBWs. This embodiment enables down-converter 110 to instantaneously change its IBW under software and/or firmware control. For this embodiment, the pass-band and −40 dB rejection band of IF2 BPF 117 is set to match the IF1 BPF 116 (303a-n) having the widest IBW. IF1 BPF 126 in up-converter 120 should be similar to IF1 BPF 116.

Although down-converter 110 and up-converter 120 can be set to the same RF input/output center frequencies and IBWs (either with their own internal LOs or with external shared LOs), the present embodiment can also support converters 110, 120 operating at a different center frequency and/or different IBWs.

As converters are required to cover wider and wider IBW's, having the ability to have on-the-fly selectable IBW's can be paramount to achieving/maintaining probability of intercept (POI) performance in dense and complex emitter signal environments in that not being able to "throttle back" the extremely wide IBWs can result in "choking" of the receiver and thus significant missed detections. The present techniques mitigates a significant vulnerability of the conventional converters having only a single-fixed IBW.

With reference now to FIG. 4, there is illustrated a block diagram of LO1 114, according to one embodiment. As shown, LO1 114 includes a half-frequency local oscillator 402 operating at one-half the frequency of the final desired LO1 output signals for driving mixer 112. The one-half frequency output is simultaneously routed to a frequency doubler 404 in addition to the external LO1 in/out port 151 of down-converter 110. Frequency doubler 404 is able to accept an input from either one-half frequency local oscillator 402 or external LO1 in/out port 151, for which case that signal would be coming from the one-half frequency source of up-converter 120 or from some other converter. Although not shown in FIG. 4, such conversion is accomplished with RF splitters, couplers, and switches located between one-half frequency local oscillator 402, frequency doubler 404, and external LO1 in/out port 151. The purpose of starting with a one-half frequency source is that it only requires one-half of the tuning range of the final output of LO1 114 and it allows for sending and receiving external LO1 signals to/from other converters at a much lower frequency and IBW, significantly lowering the insertion loss and complexity of LO sharing and distribution switch 150.

Referring again to FIG. 4, the output of frequency doubler 404 is equally split to feed two different SW-selectable bandpass filters 406 and 408. Lower half-band BPF 408 has a pass-band that covers the lower half of LO1 114 frequency range where the upper half-band BPF 406 has a pass-band that covers the upper half of LO1 114 frequency range. BPFs 406, 408 are used to remove the third harmonics generated by frequency doubler 404 as a result of the one-half frequency inputs to frequency doubler 404. Otherwise, the primary half frequency and third harmonics thereof would enter mixer 112 along with the LO1 fundamental signal and produce erroneous spurious signals, thus degrading the ISFDR of down-converter 110. Other LO1 114 embodiments are possible using additional or differing multiplying stages, for example triplers, dual-doublers (quadruplers) etc fed by a one-third or one-quarter frequency oscillator respectively. However, a tripler and quadrupler will result in 3 and 6 dB higher local oscillator phase noise respectively, and require additional sub-octave harmonic filters. Additional phase noise losses may also result depending on the final converter freq. tune steps required which could force higher value PLL N-register values which in turn degrade the final phase noise of the sourced LO. Accordingly, the FIG. 4 embodiment may be optimal and represent a knee in the curve of electrical performance and SWAPC trade-offs.

The half frequency LO1 114 basically enables sharing the LO1 between differing converter channels at a much lower frequency—in contrast sharing at a 20-60 GHz final LO1 frequency would be less practical having high loss to share over the cable lengths. Furthermore the conventional PLL and VCO have some limitations in directly generating 20-60 GHz signals. According to one embodiment, a doubler is therefore employed.

In yet a further embodiment, the system employs a comb generator that takes an input frequency and provides N multiples simultaneously. Filtering is then done to select the frequencies of interest. The comb generator accomplishes the doubling, tripling, etc., at the same time but without the prioritization for the desired outputs that can be accommodated by the doubler, tripler, etc. A potential benefit of the comb generator is that it could have less phase noise degradation.

Referring now to FIG. 5, there is illustrated a block diagram of LO1 114', which is an alternative embodiment LO1 114. As shown, LO1 114' includes multiple one-half frequency LO1 sources, such as a first one-half frequency LO1 source 501a having a first one-half frequency, a second one-half frequency LO1 source 501b having a second one half frequency, and an $N^{th}$ one-half frequency LO1 source 501n having an $N^{th}$ one half frequency. Each of the N one-half frequency LO sources 501a-501n feeds a single pole N throw switch 503, which constitute essentially an N-way signal source. The one-half frequency output of the N-way switch 503 is simultaneously routed to a frequency doubler 504 in addition to external LO1 in/out port 151 of down-converter 110. Frequency doubler 504 is able to accept an input from either one-half frequency local oscillators 501a-501n or external LO1 in/out port 151 for which case that signal would assumedly be coming from the one-half frequency source of up-converter 120 or from some other converters. Although not shown in FIG. 5, LO1 114' is accomplished with rudimentary RF splitters, couplers, and switches located between the N-way switch 503 output, frequency doubler 504, and external LO1 in/out port 151. The output of frequency doubler 504 feeds BPF hi band 506 and BPF low band 508. The improvement of this software-selectable multiple LO1 design is that it allows for very fast (e.g. 100 nanoseconds) switching between converter tune frequencies, frequently referred to as fast "ping-pong" frequency tune mode as compared to a single PLL/VCO LO having typical tune speeds on the order of 10-30 microseconds.

Figure 6A:
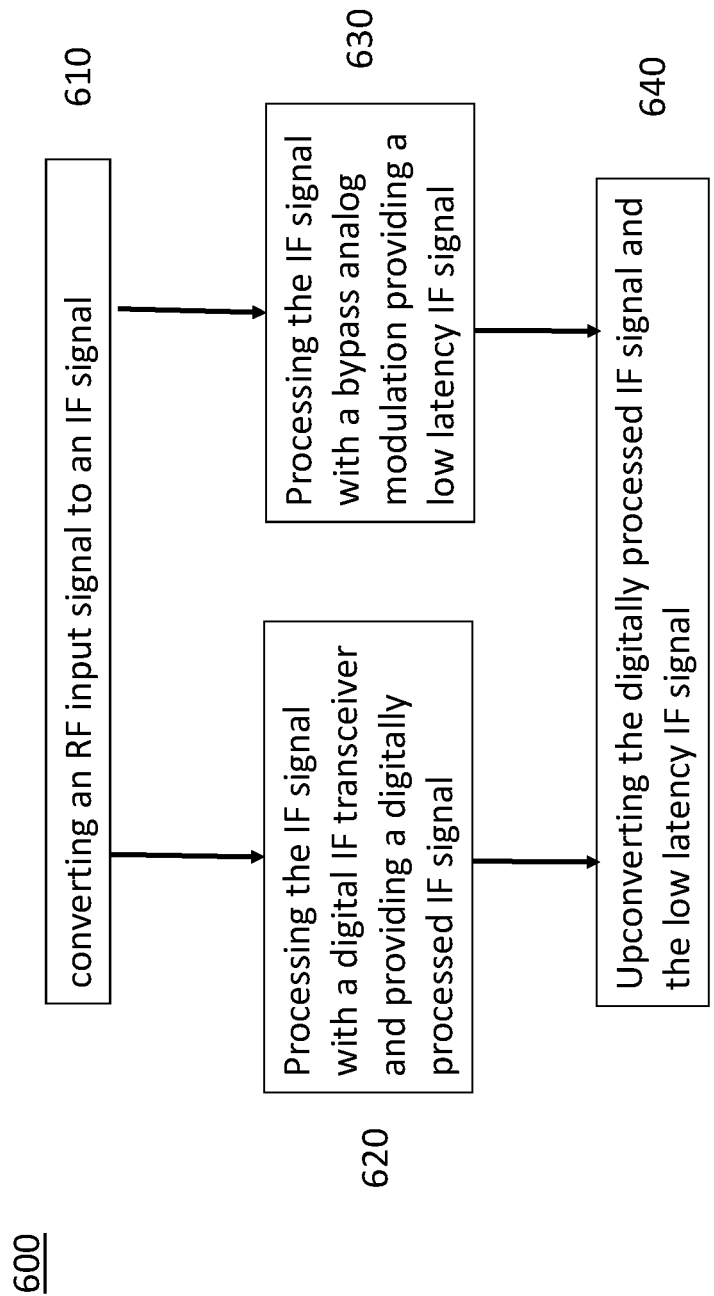
FIG. 6A is a flow chart perspective of the transceiver system, according to an embodiment.

FIG. 6A illustrates a process flow perspective of the transceiver operations 600 according to one embodiment. In one example an RF signal is received by an antenna and produces and RF input signal. In one example, the RF input signal is subject to pre-processing such as filtering through a filter bank and may also be amplified. The RF input signal can be live, simulated or stored and is subject to converting to an intermediate (IF) signal 610.

The IF signal has two possible processing paths, although the IF signal may be processed in one or both. In one example the IF signal is subject to processing with a digital IF transceiver 620 and providing a digitally processed IF signal. Processing the IF signal in the bypass analog path 630 provides a low latency signal that can provide a more rapid response than the digital processing path. In one embodiment the digitally processed IF signal and/or the bypass low latency IF signal is up-converted 640. According to a further example, the IF signal is first processed by the bypass path to provide a rapid response and the same signal is concurrently processed in the digital processing path.

Referring to FIG. 6B, the process for converting the RF signal to the IF signal is depicted according to one example. The signal is subject to processing via a first mixer which is coupled to a first local oscillator. In this example the RF signal is upconverted to a millimeter wave signal 660 by the first mixer. The millimeter wave signal output of the first mixer is filtered by at least one first bandpass filter 665. In one example there are one or more millimeter wave high-Q cavity first bandpass filters. The first bandpass filters can have varying IBWs. In one example the filtering absorbs approximately 50% of the converter's total anti-alias rejection. In addition, the first bandpass filters in one example are quarts and/or evanescent mode filters. The filtered IF signal is then processed by a second mixer coupled to a second local oscillator, down-converting the filtered millimeter wave signal to an IF signal 670. The IF output of the second mixer is filtered by at least one second bandpass filter. At this point, the second bandpass filter is only required to handle about 50% of the converter's total anti-alias rejection. The output of the downconverting process is an IF signal that is provided to at least one of an up-converter, analog-bypass modulator (low latency bypass) and a digital IF transceiver.

The up-converter path operates in the reverse manner and a shortened description is provided for convenience. The up-converter performs filtering of the IF input signal (coming from the analog-bypass modulator or a digital IF transceiver) in a first bandpass filter, upconverting the IF input signal to a millimeter wave signal in the first mixer, wherein the first mixer is coupled to a first local oscillator. The process involves filtering the millimeter wave signal in a millimeter wave bandpass filter as detailed herein. Down-converting the millimeter wave signal to an RF signal in the second mixer coupled to a second local oscillator.

As has been described, the present disclosure provides an improved digital and/or analog transceiver for handling signals over a wide tuning range. The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. In addition, various features, aspects, and embodiments have been described herein. The features, aspects, and embodiments are susceptible to combination with one another as well as to variation and modification, as will be understood in light of this disclosure. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner and may generally include any set of one or more elements as variously disclosed or otherwise demonstrated herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

While the invention has been particularly shown and described with reference to a preferred embodiment, it will be understood by those skilled in the art that various changes in form and detail may be made therein without departing from the spirit and scope of the invention.

The foregoing description and drawings of various embodiments are presented by way of example only. These examples are not intended to be exhaustive or to limit the disclosed subject matter to the precise forms disclosed. Alterations, modifications, and variations will be apparent in light of this disclosure and are intended to be within the scope of the disclosed subject matter as set forth in the claims.

What is claimed is:

1. A transceiver, comprising:
a down-converter for converting a radio-frequency (RF) input signal to an intermediate frequency (IF) signal, the down-converter comprising a first mixer coupled to the RF input signal and to a first local oscillator signal and providing a first millimeter wave signal; a first IF bandpass filter coupled to the first mixer filtering the first millimeter wave signal; a second mixer coupled to a second local oscillator signal and to the first IF bandpass filter; a second IF bandpass filter coupled to the second mixer;
an analog low latency bypass path coupled to the IF signal and configured to provide a low latency IF signal;
a digital path coupled to the IF signal and configured to provide a digitally processed IF signal; and
an up-converter for converting at least one of the low latency IF signal and the digitally processed IF signal to an RF output signal, the up-converter comprising a third IF bandpass filter coupled to at least one of the low latency IF signal and the digitally processed IF signal; a third mixer coupled to the third IF bandpass filter and a third local oscillator signal and providing a second millimeter wave signal; a fourth IF bandpass filter coupled to the third mixer; and a fourth mixer coupled to the fourth IF bandpass filter and a fourth local oscillator signal, and providing the RF output signal.

2. The transceiver according to claim 1, wherein the digital path comprises an analog to digital converter, a digital signal processor and a digital to analog converter.

3. The transceiver according to claim 1, wherein the analog low latency bypass path comprises a phase/amplitude modulator.

4. The transceiver according to claim 1, further comprising a local oscillator sharing/distribution matrix providing at least one local oscillator signal for the down-converter and at least one local oscillator signal for the up-converter.

5. The transceiver according to claim 4, further comprising at least one further transceiver, wherein the at least one further transceiver is coupled to the local oscillator sharing/distribution matrix.

6. The transceiver according to claim 1, wherein the down-converter and the up-converter convert to millimeter wave frequencies and filters the millimeter wave frequencies with cavity filters comprising quartz.

7. The transceiver according to claim 1, wherein at least one of the first IF bandpass filter, second IF bandpass filter, third IF bandpass filter and fourth IF bandpass filter is a cavity filter.

8. The transceiver according to claim 7, wherein the cavity filter comprises quartz.

9. The transceiver according to claim 7, wherein the cavity filter is a bank of millimeter wave cavity filters of differing instantaneous bandwidths (IBWs) and wherein at least one of the first IF bandpass filter and the third bandpass filter includes switches for selecting at least one of the millimeter wave cavity filters.

10. The transceiver according to claim 1, wherein a frequency of the first local oscillator signal and second local oscillator signal are higher than a pass-band frequency of the first, second, third, and fourth IF bandpass filters.

11. The transceiver according to claim 1, wherein the first local oscillator signal is from a first local oscillator and comprises a half-frequency local oscillator, a frequency doubler, and at least two bandpass filters.

12. The transceiver according to claim 1, further comprising a filter bank processing the RF input signal prior to the first mixer.

13. An apparatus, comprising:
a down-converter for converting a radio-frequency (RF) input signal to an intermediate frequency (IF) output signal, wherein the down-converter comprises:
a first mixer and a second mixer;
a first intermediate frequency (IF) bandpass filter connected between the first mixer and the second mixer, wherein a pass-band frequency of the first IF bandpass filter is higher than a frequency of the RF input signal, wherein the first IF bandpass filter comprises one or more millimeter-wave cavity filters;
a second IF bandpass filter coupled to an output of the second mixer providing the IF output signal;
a first local oscillator coupled to the first mixer, wherein a first local oscillator frequency is higher than the pass-band frequency of the first IF bandpass filter; and
a second local oscillator coupled to the second mixer, wherein a second local oscillator frequency is higher than the pass-band frequency of the first IF bandpass filter.

14. The apparatus of claim 13, wherein the one or more millimeter-wave cavity filters comprise quartz.

15. The apparatus of claim 13, wherein the one or more millimeter-wave cavity filters comprise an evanescent waveguide cavity.

16. The apparatus of claim 13, wherein the first IF bandpass filter includes switches for selecting one of the millimeter-wave cavity filters.

17. The apparatus of claim 13, wherein the first IF bandpass filter is comprised of different varying instantaneous bandwidths (IBWs).

18. The apparatus of claim 13, wherein an output from the second IF bandpass filter includes an IF center frequency between 100 MHz and 20 GHz.

19. The apparatus of claim 13, wherein at least one of the first IF bandpass filter and the second IF bandpass filter each has a minimum of 40 dB filter rejection.

20. The apparatus of claim 13, wherein at least one of the first IF bandpass filter and the second IF bandpass filter are configured to have a minimum of ½ of a total anti-alias filter rejection requirement of the converter.

21. The apparatus of claim 13, wherein the IF signal is coupled to a digital processing section.

22. The apparatus of claim 13, wherein the first local oscillator includes a half-frequency local oscillator, a frequency doubler, and two bandpass filters.

23. The apparatus of claim 13, wherein a frequency of the first local oscillator and second local oscillator are higher than the pass-band frequency of the first IF bandpass filter and the second IF bandpass filter.

24. The apparatus of claim 13, wherein a second local oscillator frequency is higher than the pass-band of the second IF bandpass filter.

* * * * *